United States Patent
Billock

(10) Patent No.: US 9,596,218 B1
(45) Date of Patent: Mar. 14, 2017

(54) METHODS AND SYSTEMS OF ENCRYPTING MESSAGES USING RATELESS CODES

(71) Applicant: Google Inc., Mountain View, CA (US)

(72) Inventor: Joseph Gregory Billock, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/261,865

(22) Filed: Apr. 25, 2014

Related U.S. Application Data

(60) Provisional application No. 61/947,042, filed on Mar. 3, 2014.

(51) Int. Cl.
*H04L 29/06* (2006.01)
*H04L 29/08* (2006.01)

(52) U.S. Cl.
CPC .......... *H04L 63/0428* (2013.01); *H04L 67/10* (2013.01)

(58) Field of Classification Search
CPC ............................ H04L 63/0428; H04L 67/10
See application file for complete search history.

(56) References Cited

U.S. PATENT DOCUMENTS

| | | | |
|---|---|---|---|
| 5,289,276 A | 2/1994 | Siracusa et al. | |
| 7,242,772 B1 * | 7/2007 | Tehranchi | 380/223 |
| 7,818,445 B2 | 10/2010 | Zuckerman et al. | |
| 8,751,819 B1 * | 6/2014 | Langsworth | 713/189 |
| 2005/0257106 A1 * | 11/2005 | Luby | H03M 13/29 714/710 |
| 2006/0087456 A1 * | 4/2006 | Luby | H03M 13/1191 341/50 |
| 2006/0107169 A1 * | 5/2006 | Vedantham | H04L 1/004 714/752 |
| 2006/0265601 A1 * | 11/2006 | Zhu | H04L 9/0637 713/184 |
| 2007/0116285 A1 * | 5/2007 | Nakai et al. | 380/255 |
| 2007/0258584 A1 * | 11/2007 | Brown et al. | 380/43 |
| 2008/0170691 A1 * | 7/2008 | Chang et al. | 380/270 |
| 2008/0317243 A1 * | 12/2008 | Ramprashad | 380/29 |
| 2009/0060198 A1 * | 3/2009 | Little | 380/278 |
| 2010/0268960 A1 * | 10/2010 | Moffat et al. | 713/181 |
| 2012/0210128 A1 * | 8/2012 | Hayashi et al. | 713/168 |
| 2013/0240621 A1 * | 9/2013 | Everett | 235/379 |

* cited by examiner

*Primary Examiner* — Jason C Chiang
(74) *Attorney, Agent, or Firm* — Fox Rothschild LLP

(57) ABSTRACT

A method of communicating a message using rateless codes, may include, by a sender electronic device, identifying a message to be sent to a receiver, disassembling the message into a plurality of message blocks, identifying one or more encoded block identifiers, selecting a subset of the message blocks, for one or more of the message blocks in the subset, performing a rateless encoding operation on the message blocks using the associated encoded block identifier to generate an encoded message block, encrypting one or more of the encoded message blocks to generate one or more encoded encrypted message blocks; and transmitting one or more of the encoded encrypted message blocks and corresponding encoded block identifier to a receiver.

12 Claims, 4 Drawing Sheets

METHODS AND SYSTEMS OF ENCRYPTING MESSAGES USING RATELESS CODES

CROSS-REFERENCE TO RELATED APPLICATIONS

This application claims priority to U.S. Patent Application 61/947,042, filed on Mar. 3, 2014, the entirety of which is included herein by reference.

BACKGROUND

Rateless codes, otherwise known as fountain codes, can be used to transmit messages in a rateless way. Rateless transmissions do not need to exhibit a fixed code rate, and even if they do the rate may not be known to the receiver. Rather, rateless codes may include any number of bits or symbols per transmission. During rateless transmission, no acknowledgement from a receiver may be needed, since message fragments are sent in a way that provides a high probability that the receiver can reassemble the message when it has a sufficiently large subset of the fragments, even if some losses occur during transmission. The receiver simply receives the fragments and, when it has enough fragments to reconstruct the message, it does so. As such, transmission can be uncoordinated and asynchronous. Coded blocks can be transmitted a receiver in any order, over any time period and by any number of transmitters. These features makes rateless codes a practical approach for relaying cellular communications, among other types of communications.

However, these features also make traditional encryption schemes difficult to implement. When an encrypted message is streamed over a communication medium that uses reverse communication, the message is usually sent block-by-block, and each block is acknowledged by the receiver. This allows the sender to chain the block encryption process. However, since there is no order to the coded blocks that are generated using rateless codes, common encryption protocols will not work.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of communicating a message using rateless codes, may include, by a sender electronic device, identifying a message to be sent to a receiver, disassembling the message into a plurality of message blocks, identifying one or more encoded block identifiers, selecting a subset of the message blocks, for one or more of the message blocks in the subset, performing a rateless encoding operation on the message blocks using the associated encoded block identifier to generate an encoded message block, encrypting one or more of the encoded message blocks to generate one or more encoded encrypted message blocks; and transmitting one or more of the encoded encrypted message blocks and corresponding encoded block identifier to a receiver.

In an embodiment, a system of communicating a message using rateless codes may include a sender electronic device and a computer-readable storage medium in communication with the sender electronic device. The computer-readable storage medium may include one or more programming instructions that, when executed, causes the sender electronic device to identify a message to be sent to a receiver, disassemble the message into a plurality of message blocks, identify one or more encoded block identifiers, select a subset of the message blocks, for one or more of the message blocks in the subset, perform a rateless encoding operation on the message blocks using the associated encoded block identifier to generate an encoded message block, encrypt one or more of the encoded message blocks to generate one or more encoded encrypted message blocks, and transmit one or more of the encoded encrypted message blocks and corresponding encoded block identifier to a receiver.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like. When used in the claims, reference to "a computing device" may include a single device, or it may refer to any number of devices having one or more processors that communicate with each other and share data and/or instructions to perform the claimed steps.

A "message" refers to a sequence of data that is to be transmitted from a sender electronic device to a receiver electronic device. For instance, in a cellular communication network, a message may include data that is identified and transmitted by a cellular tower electronic device to a mobile electronic device.

Figure 1:
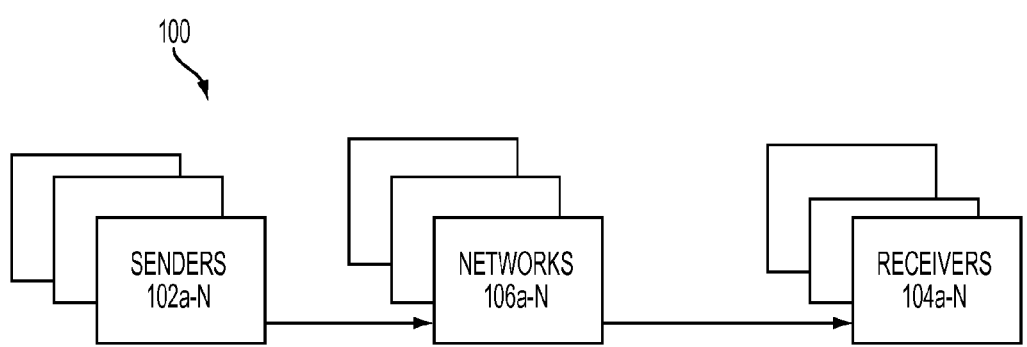
FIG. 1 illustrates an example system for communicating a message according to an embodiment.

FIG. 1 illustrates an example system for communicating a message. As illustrated by FIG. 1, the system 100 may include one or more electronic devices that act as senders 102a-N, one or more electronic devices that serve as receivers 104a-N, and one or more communication networks 106a-N via which data passes between the senders and receivers. In an embodiment, a sender 102a-N may be an electronic device capable of sending one or more messages. A sender may be a computing device, a radio transmitter, a mobile electronic device, a cellular tower, and/or the like. Each receiver 104a-N may be an electronic device capable of receiving one or more messages from a sender. Example receivers 104a-N may include, without limitation, a computing device, a mobile device, a tablet and/or the like.

A sender 102a-N may communicate with a receiver 104 via one or more communication networks 106a-N. Each communication network 106a-N may be a local area network (LAN), a wide area network (WAN), a mobile or cellular communication network, an extranet, an intranet, the Internet and/or the like.

Figure 2:
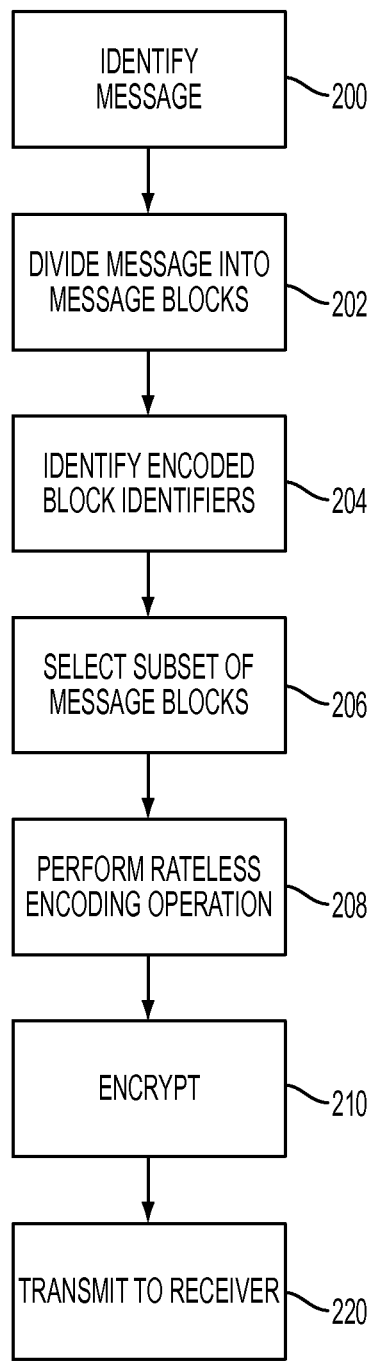
FIG. 2 illustrates a flow chart of an example method of transmitting a message according to an embodiment.

FIG. 2 illustrates a method of transmitting a message according to an embodiment. As illustrated by FIG. 2, a sender or a processor that is in communication with the sender may identify a message that is to be sent to a receiver 200. (For simplicity, in this context the term "sender" may refer either to the actual sender or to the associated processor.)

In order to disseminate a message to one or more receivers, the sender may use a rateless encoder to divide 202 the message into one or more message blocks (i.e. message blocks containing at least a portion of the content of the message) that are suitable for encoding. In an embodiment, the sender may identify 204 one or more encoded block identifiers. An encoded block identifier may be an integer that identifies each encoded source block of a message so that the receiver can know how to re-assemble the message from the encoded source blocks. The encoded block identifier may be randomly or pseudo-randomly generated by the sender. The encoded block identifier in this step may be one such as that referred to in prior art such as IETF RFC 5053 as an Encoding Symbol ID.

A subset of the message blocks may be selected 206 according to an embodiment. The message blocks may be selected 206 based at least in part on a corresponding encoded block identifier.

In an embodiment, a rateless encoding operation may be performed 208 on one or more of the message blocks using the associated encoded block identifier to generate an encoded message block. The content of the selected subset of message blocks may be combined to generate an encoded message source block. For example, the content of the selected subset of message blocks may be combined using an exclusive OR (XOR) operation applied bitwise to the bits of each selected message block in the subset to generate an encoded message block. According to various embodiments, different subsets may be selected 206 and a rateless encoding operation may be performed 208 to generate multiple encoded message blocks.

In an embodiment, the system may encrypt 210 one or more of the encoded message blocks to generate one or more encoded encrypted message blocks. According to various embodiments, the system may initialize a ciphersystem by deriving an initialization vector. An initialization vector may rely on a shared secret between a sender and a receiver. For example, a system may derive an initialization vector using an encoded block identifier and a key that is shared with the receiver. In certain embodiments, an initialization vector may be derived in a one-way operation from the associated encoded block identifier and a shared key. For example, a code block identifier may be passed through a cryptographically secure hash function such as SHA-256.

An encoded message block may be encrypted using the ciphersystem as initialized by the derived initialization vector. For example, the system may use the AES ciphersystem in CTR mode. Additional and/or alternate ciphersystems may be used within the scope of this disclosure.

In an embodiment, the sender may transmit 220 one or more of the encoded encrypted message blocks and the corresponding encoded block identifier to the receiver via the network. In certain embodiments, the sender may transmit 220 the shared secret to the receiver as part of the message header information. For instance, the sender may transmit the shared secret to the receiver using public key cryptography, utilizing the public key of the receiver, as part of the message header information.

It is notable that in the embodiments described above, the tasks need not all be performed by a single sender. Message block processing and transmission activities may be divided between (or duplicated by) multiple senders, as the receiver can receive the blocks from any location.

Figure 3:
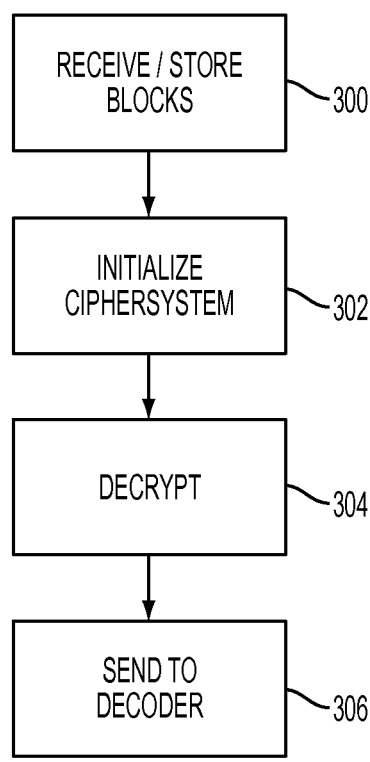
FIG. 3 illustrates a flow chart of an example process according to an embodiment.

FIG. 3 illustrates an example process that a receiver may implement when it receives the encoded encrypted message blocks as generated above. In particular, when the receiver receives the encoded encrypted message blocks, it may store 300 them. The receiver may then initialize 302 the ciphersystem. In certain embodiments, the sender and receiver may both possess an indication of which ciphersystem is to be used. For example, the sender and receiver may share a key that may be used to determine which ciphersystem to use. In other embodiments, the sender and receiver may coordinate with one another as to the ciphersystem to be used.

The receiver may initialize 302 the ciphersystem by deriving the same initialization vector used by the sender. The receiver may use the received encoded block identifier and the key shared with the sender to derive the initialization vector. For instance, the receiver may pass the encoded block identifier through a cryptographically secure hash function such as SHA-256.

The receiver may decrypt 304 one or more encrypted encoded message blocks using the initialized ciphersystem to generate one or more decrypted encoded message blocks. The encrypted encoded message block may be decrypted 304 using the ciphersystem selected in decryption mode using the complementary operation to the encryption mode. For instance, decryption may use the AES cryptosystem in CTR mode.

The receiver may send 306 one or more of the decrypted encoded message blocks and the corresponding encoded block identifiers to a decoder for decoding.

Figure 4:
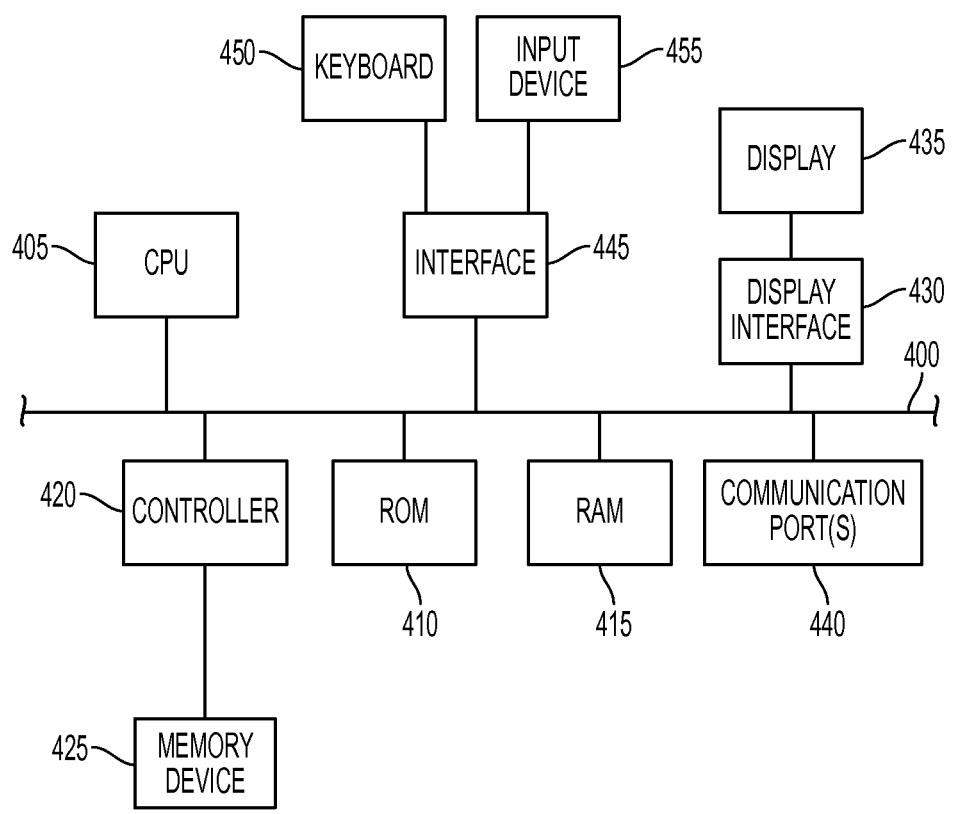
FIG. 4 illustrates a block diagram of example hardware that may be used to contain or implement program instructions according to an embodiment.

FIG. 4 depicts a block diagram of hardware that may be used to contain or implement program instructions. Hardware such as that described here may be included in a sender device and/or receiver device. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices. Program instructions, software or interactive modules for providing the interface and performing any of the claimed steps may be stored in the ROM 410, the RAM 415 and/or other computer-readable storage media 425.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communication network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

The invention claimed is:

1. A method of communicating a message using rateless codes, the method comprising, by a sender electronic device:
   identifying a message to be sent to a receiver;
   disassembling the message into a plurality of message blocks;
   identifying one or more encoded block identifiers that correspond to the message blocks;
   selecting a plurality of subsets of the message blocks based on the corresponding one or more encoded block identifiers;
   for each subset of the plurality of subsets, performing a rateless encoding operation on the message blocks in the subset using the corresponding encoded block identifier to generate an encoded message block such that the generated encoded message block is identified by the corresponding encoded block identifier;
   encrypting one or more of the encoded message blocks to generate one or more encoded encrypted message blocks by:
      applying a cryptographically secure hash function to the corresponding encoded block identifier to generate an updated encoded block identifier,
      deriving an initialization vector using the updated encoded block identifier and a secret that is shared between the sender and the receiver,
      initializing a ciphersystem using the derived initialization vector, and
      encrypting the one or more encoded message blocks using the initialized ciphersystem to generate one or more encoded encrypted message blocks; and
   transmitting one or more of the encoded encrypted message blocks and the corresponding encoded block identifier to a receiver.

2. The method of claim 1, wherein identifying one or more encoded block identifiers comprises pseudo-randomly identifying an integer value.

3. The method of claim 1, wherein identifying one or more encoded block identifiers comprises randomly identifying an integer value.

4. The method of claim 1, wherein performing a rateless encoding operation on a selected subset of the plurality of message blocks to generate an encoded message block comprises combining the message blocks in the selected subset to generate the encoded message block by applying an exclusive OR operation on the message blocks.

5. The method of claim 1, further comprising:
   receiving, by the receiver, the encoded encrypted message block;
   decrypting, by the receiver, the encoded encrypted message block to generate a decrypted encoded message block; and
   decoding the decrypted encoded message block.

6. The method of claim 5, wherein decrypting the encoded encrypted message block comprises:
   using the updated encoded block identifier and a secret that is shared between the sender and receiver to derive an initialization vector; and
   initializing a ciphersystem using the derived initialization vector; and
   using the initialized ciphersystem in a decryption mode to generate the decrypted encoded message block.

7. A system of communicating a message using rateless codes, the system comprising:
   a sender electronic device; and
   a computer-readable storage medium in communication with the sender electronic device, wherein the computer-readable storage medium comprises one or more programming instructions that, when executed, causes the sender electronic device to:
      identify a message to be sent to a receiver,
      disassemble the message into a plurality of message blocks,
      identify one or more encoded block identifiers that correspond to the message blocks,
      select a plurality of subsets of the message blocks based on the corresponding one or more encoded block identifiers,
      for each subset of the plurality of subsets, perform a rateless encoding operation on the message blocks in the subset using the corresponding encoded block identifier to generate an encoded message block such that the generated encoded message block is identified by the corresponding encoded block identifier,
      encrypt one or more of the encoded message blocks to generate one or more encoded encrypted message blocks by:
         applying a cryptographically secure hash function to the corresponding encoded block identifier to generate an updated encoded block identifier,
         deriving an initialization vector using the updated encoded block identifier and a secret that is shared between the sender and the receiver,
         initializing a ciphersystem using the derived initialization vector, and
         encrypting the one or more encoded message blocks using the initialized ciphersystem to generate one or more encoded encrypted message blocks, and
      transmit one or more of the encoded encrypted message blocks and the corresponding encoded block identifier to a receiver.

8. The system of claim 7, wherein the one or more programming instructions that, when executed, cause the sender electronic device to identify one or more encoded block identifiers comprise one or more programming instructions that, when executed, cause the sender electronic device to pseudo-randomly identify an integer value.

9. The system of claim 7, wherein the one or more programming instructions that, when executed, cause the sender electronic device to identify one or more encoded block identifiers comprise one or more programming instructions that, when executed, cause the sender electronic device to randomly identify an integer value.

10. The system of claim 7, wherein the one or more programming instructions that, when executed, cause the sender electronic device to perform a rateless encoding operation on a selected subset of the plurality of message blocks to generate an encoded message block comprise one or more programming instructions that, when executed, cause the sender electronic device to combine the message blocks in the selected subset to generate the encoded message block by applying an exclusive OR operation on the message blocks.

11. The system of claim 7, further comprising:
a receiver electronic device; and
a second computer-readable storage medium in communication with the receiver electronic device, wherein the second computer-readable storage medium comprises one or more programming instructions that, when executed, causes the receiver electronic device to:
receive the encoded encrypted message block,
decrypt the encoded encrypted message block to generate a decrypted encoded message block, and
decode the decrypted encoded message block.

12. The system of claim 11, wherein the one or more programming instructions that, when executed, cause the receiver electronic device to decrypt the encoded encrypted message block comprise one or more programming instructions that, when executed, cause the receiver electronic device to:
use the received encoded block identifier and a key that is shared between the sender and receiver to derive an initialization vector;
initialize a ciphersystem using the derived initialization vector; and
use the initialized ciphersystem in a decryption mode to generate the decrypted encoded message block.

* * * * *